(12) United States Patent
LaPointe et al.

(10) Patent No.: US 9,359,968 B2
(45) Date of Patent: Jun. 7, 2016

(54) AIR-FUEL-RATIO DITHERING USING A DUAL FUEL PATH SOURCE

(71) Applicant: Cummins IP, Inc., Columbus, IN (US)

(72) Inventors: Leon A. LaPointe, Columbus, IN (US); Edward J. Lyford-Pike, Columbus, IN (US); Daniel J. Mohr, Scipio, IN (US); Ashish Gupta, Columbus, IN (US); James A. Zigan, Versailles, IN (US)

(73) Assignee: CUMMINS IP, INC., Columbus, IN (US)

( * ) Notice: Subject to any disclaimer, the term of this patent is extended or adjusted under 35 U.S.C. 154(b) by 304 days.

(21) Appl. No.: 14/186,421

(22) Filed: Feb. 21, 2014

(65) Prior Publication Data

US 2014/0261351 A1    Sep. 18, 2014

Related U.S. Application Data

(60) Provisional application No. 61/784,610, filed on Mar. 14, 2013.

(51) Int. Cl.

| | |
|---|---|
| *F02B 37/00* | (2006.01) |
| *F02D 41/30* | (2006.01) |
| *F02M 21/02* | (2006.01) |
| *F02B 43/00* | (2006.01) |
| *F02D 41/10* | (2006.01) |
| *F02D 41/00* | (2006.01) |
| *F02D 19/06* | (2006.01) |

(52) U.S. Cl.
CPC ............... *F02D 41/30* (2013.01); *F02B 37/00* (2013.01); *F02B 43/00* (2013.01); *F02D 19/061* (2013.01); *F02D 19/0647* (2013.01); *F02D 41/0007* (2013.01); *F02D 41/107* (2013.01); *F02D 41/3094* (2013.01); *F02M 21/0245* (2013.01); *Y02T 10/144* (2013.01); *Y02T 10/36* (2013.01)

(58) Field of Classification Search
CPC .......... F02B 37/00–37/24; F02B 43/00–43/12; F02M 21/0245
USPC ................ 701/104; 123/559.2, 563, 527, 528
See application file for complete search history.

(56) References Cited

U.S. PATENT DOCUMENTS

| | | | | |
|---|---|---|---|---|
| 3,577,726 | A * | 5/1971 | Wagner | F02B 33/44 123/528 |
| 6,289,877 | B1 | 9/2001 | Weisbrod et al. | |
| 6,748,932 | B1 * | 6/2004 | Sorter | F02B 43/10 123/527 |
| 6,845,760 | B2 | 1/2005 | Linna et al. | |

(Continued)

FOREIGN PATENT DOCUMENTS

| | | |
|---|---|---|
| GB | 2 062 903 A | 5/1981 |
| GB | 2 393 140 A | 3/2004 |

*Primary Examiner* — Erick Solis
(74) *Attorney, Agent, or Firm* — Foley & Lardner LLP

(57) ABSTRACT

An apparatus for dithering fuel into an internal combustion engine includes a turbine that is powered by the internal combustion engine and a first fuel injector that injects a first fuel into an air stream to create a fuel/air stream. The apparatus also includes an air/fuel compressor that provides a compressed fuel/air stream to the internal combustion engine. The air/fuel compressor is powered by the turbine, and the air/fuel compressor compresses the fuel/air stream to create the compressed fuel/air stream. Additionally, the apparatus includes a second fuel injector that injects a second fuel into the compressed fuel/air stream prior to the compressed fuel/air stream entering the engine and after the compressed fuel/air stream exits the air/fuel compressor.

20 Claims, 3 Drawing Sheets

(56) References Cited

U.S. PATENT DOCUMENTS

| | | | |
|---|---|---|---|
| 7,841,322 B2 * | 11/2010 | Bach | F02B 29/0418 123/480 |
| 7,913,668 B2 | 3/2011 | Lewis et al. | |
| 7,958,866 B2 | 6/2011 | Thomas | |
| 2008/0245058 A1 | 10/2008 | Boddy et al. | |
| 2011/0155112 A1 * | 6/2011 | Schiestl | F02B 29/0418 123/672 |
| 2014/0216029 A1 * | 8/2014 | Gruber | C10K 1/04 60/605.1 |
| 2016/0017845 A1 * | 1/2016 | Huang | F02M 21/0209 290/1 A |

* cited by examiner

AIR-FUEL-RATIO DITHERING USING A DUAL FUEL PATH SOURCE

CROSS-REFERENCE TO RELATED APPLICATION

This application claims the benefit of U.S. Provisional Patent Application No. 61/784,610, filed Mar. 14, 2013, which is incorporated herein by reference.

FIELD

This invention relates to fuel systems internal combustion engines and more particularly relates to air/fuel ratio dithering in a fuel system for an internal combustion engine.

BACKGROUND

For internal combustion engines, the engine often runs in an optimal condition at steady state. For example, when the engine is in a vehicle and the vehicle is traveling at a constant speed on a flat road. During the steady state condition, a multi-stage catalyst that receives exhaust from the engine and removes a portion of pollutants and particulate from the exhaust may perform at an optimum level or may operate within specified limits.

However, there are often conditions where the engine is in transient state, such as sudden acceleration or deceleration, encountering a hill, etc. During the transient conditions, the engine and/or catalyst may not run at optimally or may operate outside the specified limits. One reason for the decreased performance of the engine is a transport delay where an increase in fuel rate input into the engine is delayed by various components, such as a compressor and/or a charge air cooler.

SUMMARY

The subject matter of the present application has been developed in response to the present state of the art, and in particular, in response to the problems and needs in the internal combustion engine system art associated with transient operating conditions that have not yet been fully solved by currently available systems. Accordingly, disclosed herein are apparatus, methods, and systems that overcome many of the shortcomings of the prior art.

According to one embodiment, an apparatus for dithering fuel into an internal combustion engine includes a turbine that is powered by the internal combustion engine and a first fuel injector that injects a first fuel into an air stream to create a fuel/air stream. The apparatus also includes an air/fuel compressor that provides a compressed fuel/air stream to the internal combustion engine. The air/fuel compressor is powered by the turbine, and the air/fuel compressor compresses the fuel/air stream to create the compressed fuel/air stream. Additionally, the apparatus includes a second fuel injector that injects a second fuel into the compressed fuel/air stream prior to the compressed fuel/air stream entering the engine and after the compressed fuel/air stream exits the air/fuel compressor.

In some implementations, the apparatus also includes a catalyst in exhaust receiving communication with the engine. The apparatus may also include a charge air cooler that cools the compressed fuel/air stream. The charge air cooler is positioned in the compressed fuel/air stream between the fuel/air compressor and the engine. The second fuel injector injects the second fuel into the compressed fuel/air stream after the compressed fuel/air stream leaves the charge air cooler.

According to some implementations of the apparatus, the second fuel injector injects a compressed second fuel into the compressed fuel/air stream. The apparatus can include a fuel compressor separate from the fuel/air compressor, where the fuel compressor is configured to compress the second fuel injected by the second fuel injector. The fuel compressor can be powered by a power source other than the turbine.

In certain implementations of the apparatus, the second fuel injector injects the second fuel into the compressed fuel/air stream only in response to a transient loading condition of the engine. The second fuel injector may, in some implementations, inject the second fuel into the compressed fuel/air stream during steady-state and transient loading conditions of the engine. In such latter implementations, the second fuel injector injects more of the second fuel into the compressed fuel/air stream during increased transient loading conditions on the engine, and injects less of the second fuel into the compressed fuel/air stream during decreased transient loading conditions of the engine.

According to some implementations of the apparatus, at least one of the first and second fuels is a gaseous fuel. The first and second fuels can be the same fuel. However, in certain implementations, the first and second fuels are different.

In another embodiment, an apparatus for dithering fuel into an internal combustion engine includes a turbine powered by exhaust from the internal combustion engine, a first fuel injector that injects a portion of fuel into an air stream to create a fuel/air stream, and an air/fuel compressor that provides a compressed fuel/air stream. The air/fuel compressor is powered by the turbine, and compresses the fuel/air stream to create the compressed fuel/air stream. The apparatus also includes a charge air cooler that cools the compressed fuel/air stream, where the charge air cooler receives the compressed fuel/air stream from the compressor and provides the compressed fuel/air stream to the engine. Further, the apparatus includes a fuel compressor that compresses another portion of the fuel to form a compressed fuel and a second fuel injector that injects the compressed fuel from the fuel compressor into the compressed fuel/air stream prior to the compressed fuel/air stream entering the engine and after the compressed fuel/air stream exits the charge air cooler.

According to some implementations of this embodiment, the fuel compressor is powered by a source other than the turbine. The apparatus may further include an alternator, where the fuel compressor is powered by the alternator. The second fuel injector can inject the compressed fuel into the compressed fuel/air stream in response to a transient loading condition on the engine. Additionally, the apparatus may include a fuel flow module that adjusts flow volume of the compressed fuel/air stream into the engine to adjust engine output, and a dithering module that adjusts an amount of fuel injected by the second fuel injector into the compressed fuel/air stream in response to a transient loading condition of the engine.

According to yet another embodiment, a method for dithering fuel into an internal combustion engine includes injecting fuel into an air stream to create a fuel/air stream, compressing the fuel/air stream to create a compressed fuel/air stream, combusting the compressed fuel/air stream, and dithering fuel into the compressed fuel/air stream before the fuel/air stream is combusted. In some implementations of the method, fuel is dithered into the compressed fuel/air stream only in response to a transient loading condition of the engine. According to yet some implementations of the method, dithering fuel into the compressed fuel/air stream includes adjusting the quantity of the dithered fuel in response to a transient loading condition of the engine.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
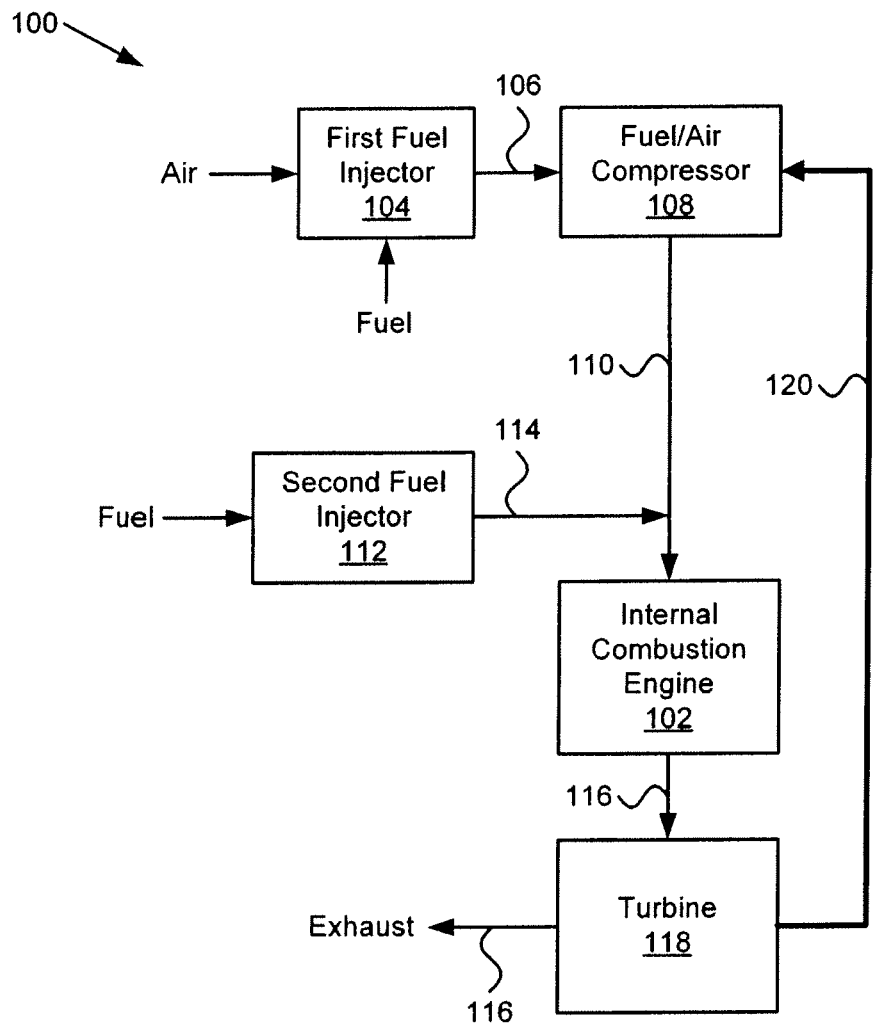
FIG. 1 is a schematic block diagram illustrating one embodiment of an apparatus for dithering fuel in accordance with one embodiment of the present invention.

FIG. 1 is a schematic block diagram illustrating one embodiment of an apparatus 100 for dithering fuel in accordance with one embodiment of the present invention. The apparatus 100 includes an internal combustion engine 102, a first fuel injector 104, a fuel/air stream 106, a fueUair compressor 108, a compressed fuel/air stream 110, a second fuel injector 112, a dithering fuel stream 114, exhaust gas piping 116, a turbine 118, and power 120 from the turbine 118 to the fuel/air compressor 108, which are described below. Note that a "fuel injector," as used herein may include a fuel metering device that may be a linear device, a time-based pulse-width modulated device, a crank synchronized device that is synchronized with a crank shaft position, or other device known to those in the art to inject fuel into an air stream or into an engine 102.

The apparatus 100 includes an internal combustion engine 102 that provides power to a vehicle, a generator, a pump, or some other load appropriate for the engine 102. The engine 102, in one embodiment, is fed by a fuel that is in a gaseous state. For example, the fuel may be natural gas, autogas, biogas, etc. In another embodiment, the fuel is in a liquid state and then is converted to a gaseous state prior to use by the engine 102. In one embodiment, the engine 102 includes a turbocharger that includes a turbine 118 that provides power 120 to a fuel/air compressor 108. The apparatus 100 includes a first fuel injector 104 that injects the fuel into an air stream to create a fuel/air stream 106, which is fed into the fuel/air compressor 108.

The fuel/air compressor 108 compresses the fuel/air stream 106 to a suitable pressure for injection into the engine 102. The fuel/air compressor 108 typically can be used to overcome low pressure issues associated with the fuel, such as, for example, where the fuel is low pressure pipeline natural gas or other condition where the fuel pressure is lower than an ideal pressure or a pressure within a specified range. In one embodiment, fuel and air are fed directly to the fuel/air compressor 108 and the fuel/air compressor 108 may include regulating functions of the first fuel injector 104.

The fuel/air compressor 108 compresses the fuel/air stream 106 to create a compressed fuel/air stream 110. The first fuel injector 104 and the fuel/air compressor 108 and possibly other components add time to a fuel cycle and typically increase transport delay. The transport delay may cause compressed fuel/air stream 110 to the engine 102 to be too lean or too rich under transient conditions of the engine 102. For example, a vehicle powered by the engine 102 may encounter a hill and an operator may press a fuel pedal to increase fuel to the engine 102. Transport delay caused by at least the first fuel injector 104 (e.g., it's distance away from the engine 102) and the fuel/air compressor 108 may cause the compressed fueUair stream 110 to be at a lower level than required by the engine 102 based on the increased load of the hill so the engine 102 may run lean, which may affect performance of the engine 102 and downstream components, such as an exhaust catalyst.

The second fuel injector 112 injects fuel (i.e. a dithering fuel stream 114) into the compressed fuel/air stream 110 prior to the compressed fuel/air stream 110 entering the engine 102 and after the compressed fuel/air stream 110 exits the fuel/air compressor 108. By injecting the dithering fuel stream 114 into the compressed fuel/air stream 110 just ahead of the engine 102, the second fuel injector 112 typically is able to react quicker to a transient condition than the transport delay, thus allowing the engine 102 to operate in more efficient conditions (e.g., by more responsively receiving a fuel/air stream with a more accurate or desirable air-to-fuel ratio) than an engine without the second fuel injector 112. The fuel injected by the second fuel injector 112 can be the same fuel as or a different fuel than the fuel injected by the first fuel injector 104. One or both of the fuels injected by the first and second fuel injectors can be a gaseous fuel.

A turbine 118 is powered by the engine 102, typically by exhaust from the engine 102. The turbine 118, in one embodiment, provides power 120 to run the fuel/air compressor 108 in a typical turbocharger application. In one embodiment, the turbine 118 is connected to the fuel/air compressor 108 through a shaft and the shaft provides power 120 to run the fuel/air compressor 108. In another embodiment, the turbine 118 generates electrical power 120 that runs the fuel/air compressor 108. In another embodiment, the turbine 118 provides power to one or more additional devices. Exhaust from the engine 102 travels through exhaust gas piping 116 to the turbine 118 and from the turbine 118 to additional exhaust gas piping 116 and eventually may be expelled to the atmosphere. While the turbine 118 provides power 120 to the fuel/air compressor 108, another power source may provide power to the second fuel injector 112, such as power from an alternator. In one embodiment, by powering the second fuel injector 112 separately from the fuel/air compressor 108 and other components that contribute to the transport delay, the second fuel injector 112 may react quicker than the transport delay caused by the fuel/air compressor 108, the first fuel injector 104, etc. to increase or decrease the dithering fuel stream 114.

In one embodiment, the second fuel injector 112 does not inject fuel during steady-state conditions and reacts to transient conditions by injecting fuel. In another embodiment, the second fuel injector 112 does not inject fuel during steady-state conditions as well as small transient conditions and reacts only to larger transient conditions by injecting fuel. In another embodiment, the second fuel injector 112 injects some amount of fuel during steady-state conditions and reacts to larger transient conditions by increasing the amount of injected fuel, possibly for an increased loading condition, or by decreasing the amount of injected fuel, possibly for a decreased loading condition. One of skill in the art will recognize other ways to change the amount of fuel injected by the second fuel injector 112.

Figure 2:
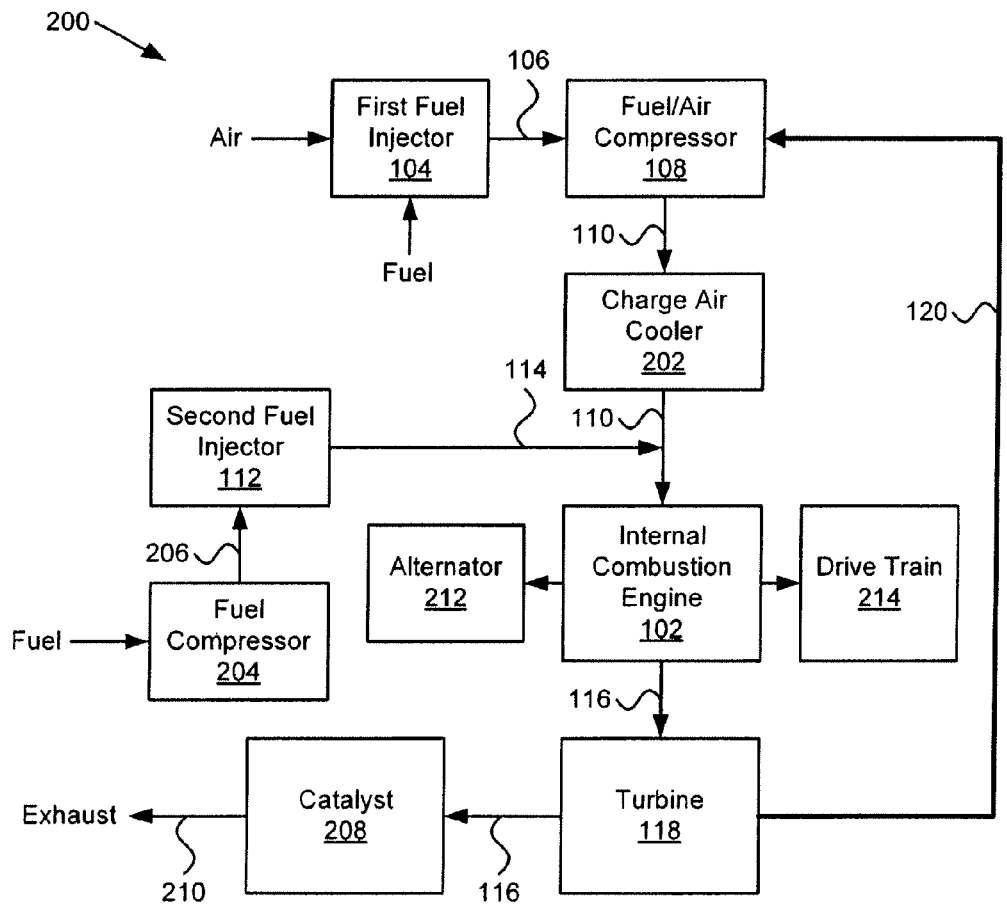
FIG. 2 is a schematic block diagram illustrating another embodiment of an apparatus for dithering fuel in accordance with one embodiment of the present invention.
Figure 2:
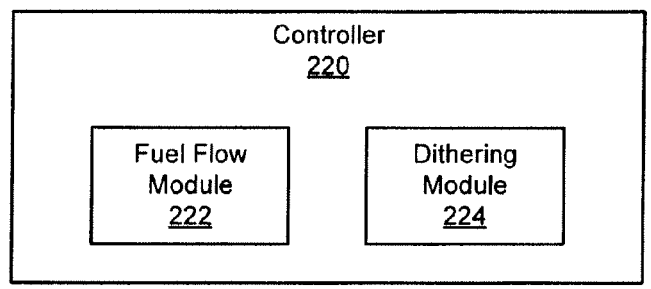

FIG. 2 is a schematic block diagram illustrating another embodiment of an apparatus 200 for dithering fuel in accordance with one embodiment of the present invention. The apparatus 200 includes an internal combustion engine 102, a first fuel injector 104, a fuel/air stream 106, a fuel/air compressor 108, a compressed fuel/air stream 110, a second fuel injector 112, a dithering fuel stream 114, exhaust gas piping 116, a turbine 118, and power 120 from the turbine 118 to the fuel/air compressor 108, which are substantially similar to those described above in relation to the apparatus 100 of FIG. 1. The apparatus 200, in various embodiments, includes a charge air cooler 202, a fuel compressor 204, a compressed fuel stream 206, a catalyst 208, a tail pipe 210, an alternator 212, a drive train 214, and a controller 220 with a fuel flow module 222 and a dithering module 224, which are describe below.

In one embodiment, the apparatus 200 includes a charge air cooler 202 that cools the compressed fuel/air stream 110. When a gas is compressed, typically temperature of the gas increases. The charge air cooler 202 cools the compressed fuel/air stream 110 coming out of the fuel/air compressor 108. Cooling the compressed fuel/air stream 110 before the compressed fuel/air stream 110 reaches the engine 102 may increase efficiency of the engine 102. The charge air cooler 202 is typically positioned in the compressed fuel/air stream 110 between the fuel/air compressor 108 and the engine 102. In one embodiment, the second fuel injector 112 injects the fuel into the compressed fuel/air stream 110 after the compressed fuel/air stream 110 leaves the charge air cooler 202. In another embodiment, the second fuel injector 112 injects the fuel into the compressed fuel/air stream 110 before the charge air cooler 202 to cool the compressed fuel/air stream 110 and the dithering fuel stream 114. However, injecting the dithering fuel stream 114 before the charge air cooler 202 may increase transport delays of the dithering fuel stream 114.

The apparatus 200, in another embodiment, includes a fuel compressor 204 that compresses fuel to create a compressed fuel stream 206 that is input to the second fuel injector 112. The dithering fuel stream 114 from the second fuel injector 112 is combined with the compressed fuel/air stream 110 before entering the engine 102. In one embodiment, the fuel compressor 204 increases pressure of the fuel to a pressure comparable with the compressed fuel/air stream 110. The fuel compressor 204 may compensate for low fuel pressure of a fuel system, as described above. In other embodiments, the fuel compressor 204 increases pressure of the fuel to a pressure above or below the compressed fuel/air stream 110.

In one embodiment, the fuel compressor 204 and the second fuel injector 112 have an order that is switched from the order shown in FIG. 2. In another embodiment, the fuel compressor 204 and/or the second fuel injector 112 are powered from a source different than the turbine 118. For example, the apparatus 200 may include an alternator 212 and/or a battery (not shown) that provides power to the fuel compressor 204 and/or the second fuel injector 112. Having a power source separate from the turbine 118 may allow a quicker response to reduce transport delay. In addition, the fuel compressor 204 and/or the second fuel injector 112 may be sized or designed to operate more quickly than components that cause fuel transport delay.

In one embodiment, the apparatus 200 includes a catalyst 208 that processes the exhaust gasses from the engine 102 and expels the processed exhaust through a tail pipe 210. In one example, the catalyst 208 is an advanced three-way catalyst, which is known in the art. The advanced three-way catalyst may be for natural gas systems or for other fuels appropriate for the apparatus 200. In another embodiment, the apparatus 200 includes a catalyst 208 with fewer stages than an advanced three-way catalyst or a catalyst with a different number of stages but of a different design. In one embodiment, adding the dithering fuel stream 114 to the compressed fuel/air stream 110 allows a wider range of operation while operating within specified ranges, such as ranges required by the United States Environmental Protection Agency ("EPA").

In one embodiment, the apparatus 200 includes a drive train 214 powered by the engine 102. For example, the apparatus 200 may be part of a vehicle with a drive train 214. In other embodiments, the apparatus 200 includes gears, belts, etc. which are connected to the engine 102 and that drive equipment. In another embodiment, the engine 102 connects to a generator.

In one embodiment, the apparatus 200 includes a controller 220 with a fuel flow module 222 and a dithering module 224. The controller 220 may control operation of the engine 102 along with other systems associated with the engine 102. The controller 220 may be a single component or may have functions divided into multiple components that may be in multiple locations. In one embodiment the fuel flow module 222 adjusts flow volume of the compressed fuel/air stream 110 into the engine 102 to adjust engine output. For example, the fuel flow module 222 may be responsive to a floor pedal in a vehicle or a lever or other mechanism on a generator or other device. The fuel flow module 222 may be used to increase or decrease engine speed and/or power. In another embodiment, the dithering module 224 adjusts an amount of fuel injected by the second fuel injector 112 into the compressed fuel/air stream 110 in response to a transient loading condition for the engine 102. The dithering module 224 may include an ability to determine a transient condition for the engine 102 and may increase or decrease fuel injected by the second fuel injector 112. The dithering module 224 may use measurements from various engine parts, from the catalyst 208, etc. to determine an amount of increase or decrease for the fuel injected by the second fuel injector 112.

Figure 3:
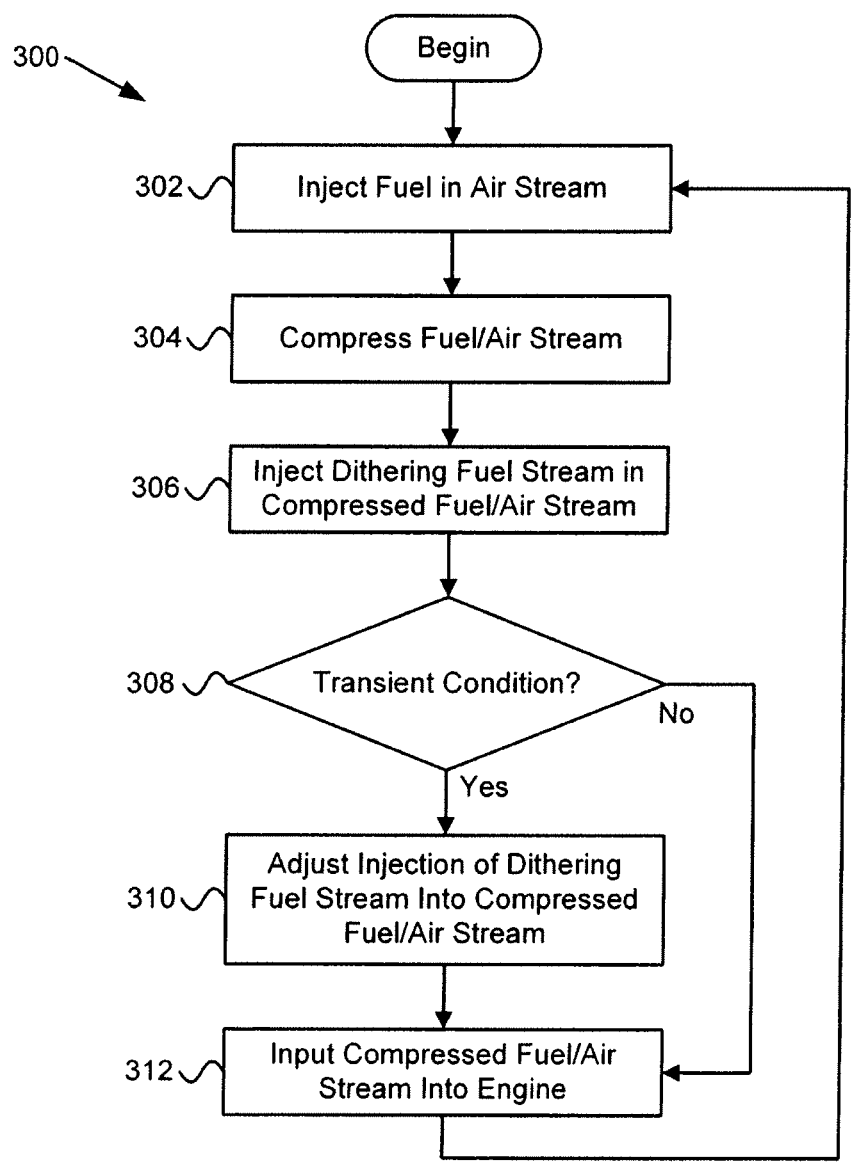
FIG. 3 is a schematic flow chart diagram illustrating one embodiment of a method for dithering fuel in accordance with one embodiment of the present invention.

FIG. 3 is a schematic flow chart diagram illustrating one embodiment of a method 300 for dithering fuel in accordance with one embodiment of the present invention. The method 300 begins and the first fuel injector 104 injects 302 fuel into an air stream of an internal combustion engine 102 to create a fuel/air stream 106. The fuel/air compressor 108 compresses 304 the fuel/air stream 106 to create a compressed fuel/air stream 110. The second fuel injector 112 injects 306 the dithering fuel stream 114 into the compressed fuel/air stream 110. The dithering module 224 determines 308 if there is a transient condition for the engine 102. If the dithering module 224 determines 308 that there is a transient condition for the engine 102, the second fuel injector 112 adjusts 310 the dithering fuel stream 114 into the compressed fuel/air stream 110 and the method 300 inputs 312 the compressed fuel/air stream 110, along with the dithering fuel stream 114 to the engine 102, and the method 300 returns and the first fuel injector 104 injects 302 fuel into the air stream. If the dithering module 224 determines 308 that there is not a transient condition for the engine 102, the method 300 inputs 312 the compressed fuel/air stream 110 without changing the dithering fuel stream 114 and the method 300 returns and the first fuel injector 104 injects 302 fuel into the air stream.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention may be embodied in other specific fauns without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for dithering fuel into an internal combustion engine, the apparatus comprising:
   a turbine powered by the internal combustion engine;
   a first fuel injector that injects a first fuel into an air stream to create a fuel/air stream;
   an air/fuel compressor that provides a compressed fuel/air stream to the internal combustion engine, the air/fuel compressor being powered by the turbine, the air/fuel compressor compressing the fuel/air stream to create the compressed fuel/air stream; and
   a second fuel injector that injects a second fuel into the compressed fuel/air stream prior to the compressed fuel/air stream entering the engine and after the compressed fuel/air stream exits the air/fuel compressor.

2. The apparatus of claim 1, further comprising a catalyst in exhaust receiving communication with the engine.

3. The apparatus of claim 1, further comprising a charge air cooler that cools the compressed fuel/air stream, the charge air cooler being positioned in the compressed fuel/air stream between the fuel/air compressor and the engine, the second fuel injector injecting the second fuel into the compressed fuel/air stream after the compressed fuel/air stream leaves the charge air cooler.

4. The apparatus of claim 1, wherein the second fuel injector injects a compressed second fuel into the compressed fuel/air stream.

5. The apparatus of claim 4, further comprising a fuel compressor separate from the fuel/air compressor, the fuel compressor being configured to compress the second fuel injected by the second fuel injector.

6. The apparatus of claim 5, wherein the fuel compressor is powered by a power source other than the turbine.

7. The apparatus of claim 1, wherein the second fuel injector injects the second fuel into the compressed fuel/air stream only in response to a transient loading condition of the engine.

8. The apparatus of claim 1, wherein the second fuel injector injects the second fuel into the compressed fuel/air stream during steady-state and transient loading conditions of the engine.

9. The apparatus of claim 8, wherein the second fuel injector injects more of the second fuel into the compressed fuel/air stream during increased transient loading conditions on the engine, and injects less of the second fuel into the compressed fuel/air stream during decreased transient loading conditions of the engine.

10. The apparatus of claim 1, wherein at least one of the first and second fuels is a gaseous fuel.

11. The apparatus of claim 1, wherein the first and second fuels are the same.

12. The apparatus of claim 1, wherein the first and second fuels are different.

13. An apparatus for dithering fuel into an internal combustion engine, the apparatus comprising:
   a turbine powered by exhaust from the internal combustion engine;
   a first fuel injector that injects a portion of fuel into an air stream to create a fuel/air stream;
   an air/fuel compressor that provides a compressed fuel/air stream, the air/fuel compressor powered by the turbine, the air/fuel compressor compressing the fuel/air stream to create the compressed fuel/air stream;
   a charge air cooler that cools the compressed fuel/air stream, the charge air cooler receiving the compressed fuel/air stream from the compressor and providing the compressed fuel/air stream to the engine;
   a fuel compressor that compresses another portion of the fuel to form a compressed fuel; and
   a second fuel injector that injects the compressed fuel from the fuel compressor into the compressed fuel/air stream prior to the compressed fuel/air stream entering the engine and after the compressed fuel/air stream exits the charge air cooler.

14. The apparatus of claim 12, wherein the fuel compressor is powered by a source other than the turbine.

15. The apparatus of claim 13, further comprising an alternator, and wherein the fuel compressor is powered by the alternator.

16. The apparatus of claim 12, wherein the second fuel injector injects the compressed fuel into the compressed fuel/air stream in response to a transient loading condition on the engine.

17. The apparatus of claim 16, further comprising a fuel flow module that adjusts flow volume of the compressed fuel/air stream into the engine to adjust engine output, and a dithering module that adjusts an amount of fuel injected by the second fuel injector into the compressed fuel/air stream in response to a transient loading condition of the engine.

18. A method for dithering fuel into an internal combustion engine, the method comprising:
- injecting fuel into an air stream to create a fuel/air stream;
- compressing the fuel/air stream to create a compressed fuel/air stream;
- combusting the compressed fuel/air stream; and
- dithering fuel into the compressed fuel/air stream before the fuel/air stream is combusted.

19. The method of claim 18, wherein fuel is dithered into the compressed fuel/air stream only in response to a transient loading condition of the engine.

20. The method of claim 18, wherein dithering fuel into the compressed fuel/air stream comprises adjusting the quantity of the dithered fuel in response to a transient loading condition of the engine.

* * * * *